(12) United States Patent
Raman et al.

(10) Patent No.: US 10,284,891 B2
(45) Date of Patent: May 7, 2019

(54) SYSTEM AND METHOD FOR PROVIDING A CUSTOMIZED VIEW OF LIVE CONTENT

(71) Applicant: Synamedia Limited, Middlesex (GB)

(72) Inventors: Rajeev Raman, Cupertino, CA (US);
Daniel G. Zuck, Santa Clara, CA (US);
Joshua E. Coolman, Cupertino, CA (US)

(73) Assignee: SYNAMEDIA LIMITED, Middlesex (GB)

( * ) Notice: Subject to any disclaimer, the term of this patent is extended or adjusted under 35 U.S.C. 154(b) by 0 days.

(21) Appl. No.: 14/486,840

(22) Filed: Sep. 15, 2014

(65) Prior Publication Data
US 2016/0080794 A1 Mar. 17, 2016

(51) Int. Cl.
| | |
|---|---|
| H04N 21/25 | (2011.01) |
| H04N 21/2668 | (2011.01) |
| H04N 21/258 | (2011.01) |
| H04N 21/472 | (2011.01) |
| H04N 21/4722 | (2011.01) |
| H04N 21/81 | (2011.01) |

(52) U.S. Cl.
CPC ... *H04N 21/2668* (2013.01); *H04N 21/25841* (2013.01); *H04N 21/25883* (2013.01); *H04N 21/4722* (2013.01); *H04N 21/47202* (2013.01); *H04N 21/8126* (2013.01)

(58) Field of Classification Search
None
See application file for complete search history.

(56) References Cited

U.S. PATENT DOCUMENTS

| | | | | |
|---|---|---|---|---|
| 6,774,926 B1* | 8/2004 | Ellis | ............... | H04N 5/44543 348/14.01 |
| 2003/0110490 A1* | 6/2003 | Dew | ............... | H04N 5/44513 725/37 |
| 2004/0111746 A1* | 6/2004 | Hoang | ............... | H04L 29/06027 725/54 |
| 2007/0027744 A1* | 2/2007 | Carson | ............... | G06F 17/2785 725/36 |
| 2008/0298358 A1* | 12/2008 | John | ............... | H04H 60/23 370/389 |
| 2009/0288125 A1* | 11/2009 | Morioka | ............... | H04N 7/1675 725/110 |
| 2010/0192175 A1 | 7/2010 | Bachet et al. | | |
| 2011/0197237 A1* | 8/2011 | Turner | ............... | H04N 21/2343 725/78 |

(Continued)

OTHER PUBLICATIONS

International Search Report dated Jan. 5, 2016 in copending PCT Application No. PCT/US2015/049986 filed Sep. 14, 2015, inventors Rajeev Raman, et al.

*Primary Examiner* — Cai Y Chen
(74) *Attorney, Agent, or Firm* — Fernando & Partners, LLP; Prateek Bhatnagar

(57) ABSTRACT

A system and method of providing a customized view for a live channel is disclosed. According to one embodiment, a computer-implemented method includes receiving an indicator from a communication protocol between a device and a content delivery network, where the content delivery network delivers a channel that is configured to provide a content item, and selecting the content item to provide to the device based on the indicator that corresponds to an attribute of the content item.

16 Claims, 8 Drawing Sheets

(56) References Cited

U.S. PATENT DOCUMENTS

2013/0262633 A1\* 10/2013 Goodwin ............... H04N 21/25
                                                       709/219
2014/0115090 A1    4/2014  Hasek
2014/0157312 A1\*  6/2014  Williams ........... H04N 21/4126
                                                       725/39

\* cited by examiner

007
SYSTEM AND METHOD FOR PROVIDING A CUSTOMIZED VIEW OF LIVE CONTENT

FIELD

The present disclosure relates in general to the field of content publishing. In particular, the present disclosure relates to a system and method for providing a customized view of live content.

BACKGROUND

Multimedia content publishing has evolved in many ways and still continues to evolve. Television is significantly the first platform that enabled content providers (e.g., content owners, creators, aggregators and advertisers) to publish and deliver multimedia content to households en masse. Television receives multimedia content by a traditional reception, such as a cable and a satellite. Personal computers and the Internet are other platforms that enable content providers to publish and deliver multimedia content. Recently, the emergence of consumer electronic devices with Internet access has created an explosion in the number of new platforms that are available to content providers. For example, such platforms include GOOGLE TV®, GOOGLE® ANDROID®, ROKU®. MICROSOFT® XBOX 360®, SONY® PLAYSTATION 3®, APPLE® IOS®, AMAZON KINDLE FIRE®, and the NINTENDO® WII®. These platforms may receive multimedia content by an over-the-top means, such as WiFi and the Ethernet.

Multimedia content is typically delivered to these platforms via on demand or live streaming. When multimedia content is delivered via on demand, a user may select and watch/listen to video or audio content at a desired time. For live streaming, the multimedia content is delivered over the Internet. The content streaming platform typically requires a content provider to create the content and digitize the content, a media publisher, and a content delivery network to distribute and deliver the content to a user device. The user device receives the live streaming of multimedia content in a sequence that is pre-determined by the content provider.

SUMMARY

A system and method for providing a customized view of live content is disclosed. According to one embodiment, a computer-implemented method includes receiving an indicator from a communication protocol between a device and a content delivery network, where the content delivery network delivers a channel that is configured to provide a content item, and selecting the content item to provide to the device based on the indicator that corresponds to an attribute of the content item.

The above and other preferred features, including various novel details of implementation and combination of elements, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments.

BRIEF DESCRIPTION OF THE FIGURES

The accompanying figures, which are included as part of the present specification, illustrate the various embodiments of the present disclosed system and method and together with the general description given above and the detailed description of the preferred embodiments given below serve to explain and the teach the principles of the present disclosure.

Figure 1:
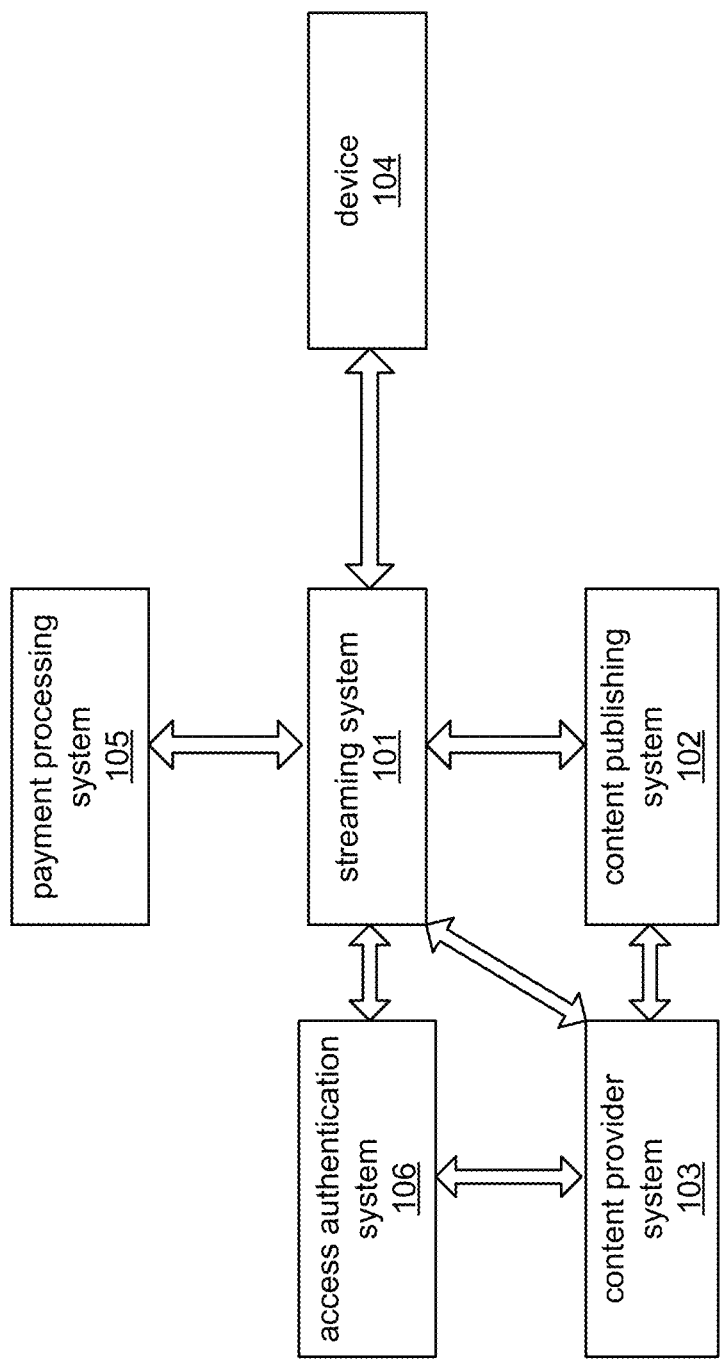
FIG. 1 illustrates an exemplary architecture for use with the present streaming system, according to one embodiment.

It should be noted that the figures are not necessarily drawn to scale and elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method for providing a customized view of live content is disclosed. According to one embodiment, a computer-implemented method includes receiving an indicator from a communication protocol between a device and a content delivery network, where the content delivery network delivers a channel that is configured to provide a content item, and selecting the content item to provide to the device based on the indicator that corresponds to an attribute of the content item.

Each of the features and teachings disclosed herein can be utilized separately or in conjunction with other features and teachings to provide a system and method for providing a customized view of live content. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A streaming system for providing a customized view of live content items is disclosed. According to one embodiment, the present streaming system delivers a channel including a content item to an Internet-based device (e.g., a computer, a television, a phone, and a tablet) using an Internet protocol (IP) over a packet-switched network such as a local area network (LAN) or the Internet. The content item includes, but is not limited to, a multimedia file, live multimedia content, a video and/or audio file, a text file, and an image file. The present streaming system further provides a customized view for content items on a live channel. In one embodiment, the present streaming system provides dynamic pricing for a content item that is delivered to the Internet-based device based on a signal indicator from the Internet protocol (IP). In one embodiment, the present streaming system delivers the content item to the Internet-based device via an IP-based set-top box. It is understood that the present streaming system delivers a content item to any Internet-based device using any communication protocol without deviating from the scope of the present disclosure.

FIG. 1 illustrates an exemplary architecture for use with the present streaming system, according to one embodiment. A content publishing system 102 receives content items from a content provider system 103. The content publishing system 102 may further receive one or more live channels that deliver content items at various times from the content provider system 103. According to one embodiment, the content publishing system 102 receives configuration settings such as content settings, appearance settings, pricing settings, feature settings, and specified publishing platforms to provide a customized application for each specified publishing platform to a device 104.

A streaming system 101 receives the content items from the content publishing system 102. According to one embodiment, the streaming system 101 receives the content items from the content provider system 103. In another embodiment, the streaming system 101 delivers content items from one or more live channels from the content publishing system 102 or the content provider system 103 in real-time to the device 104. The streaming system 101 further provides a customized view of the content items from one or more live channels to the device 104.

In one embodiment, the streaming system 101 provides dynamic pricing for each content item that is delivered to the device 104. A user may download an application for displaying content on the device 104 that is delivered from the content provider system 103 or the content publishing system 102. If the user purchases a content item on the device 104, the streaming system 101 receives payment information (e.g., credit card information) from the user on the device 104, and sends the payment information to a payment processing system 105 for authorization. If the payment processing system 105 authorizes the payment, the streaming system 101 allows the user to access the content item on the device 104. In another embodiment, the streaming system 101 receives authentication from an access authentication system and grants the device 104 access to a content item.

According to one embodiment, the access authentication system allows a user of the device 104 to input user information including a user name and a password. The access authentication system validates the user information with a customer relationship management (CRM) system to authenticate the user and ensure that the user has access to the content item on the device 104.

Figure 2:
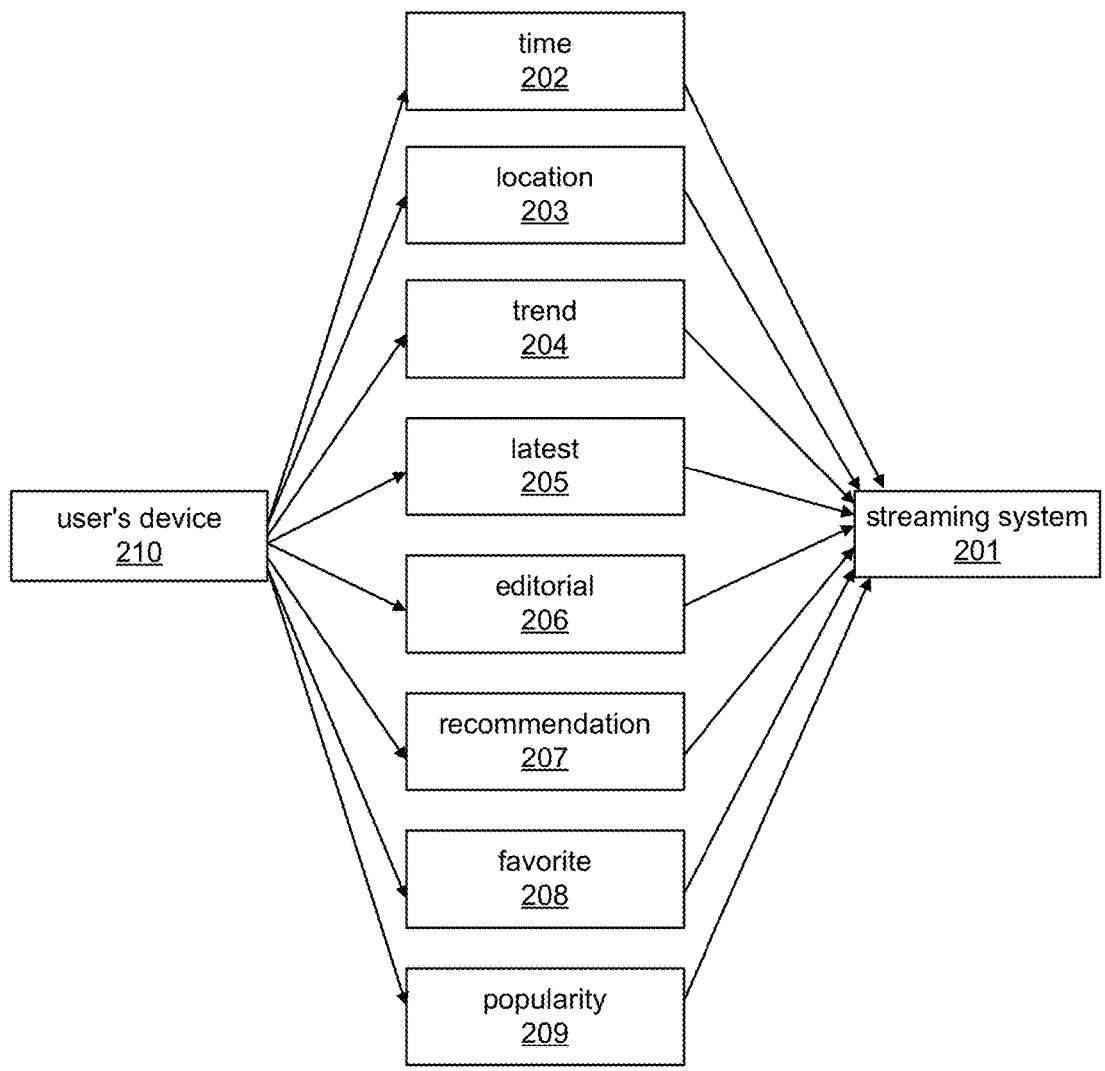
FIG. 2 illustrates exemplary signal indicators to the present streaming system, according to one embodiment.

FIG. 2 illustrates exemplary signal indicators to the present streaming system, according to one embodiment. The present streaming system 201 receives one or more signal indicators including, but not limited to, a time signal indicator 202, a location signal indicator 203, a trend signal indicator 204, a latest signal indicator 205, an editorial signal indicator 206, a recommendation signal indicator 207, a favorite signal indicator 208, and a popularity signal indicator 209. The signal indicators are based on various signals from IP packets between a user's device 210 and the present streaming system 201, including, but not limited to, an IP address, a device type, a user identifier, and content metadata. The present streaming system 201 selects a content item from a live channel to provide to the user's device 210 based on a signal indicator that corresponds to an attribute of the content item. The attribute of the content item includes, but is not limited to, a show time, a location, a hash tag, an indication of a real-time showing (e.g., a start time of the content item), a feature in an editorial, a rating, a marked content item, and a number of accesses. It is understood that the present streaming system 201 can select a content item to provide to the user's device based on a combination of signal indicators 202-209 without deviating from the scope of the present disclosure.

According to one embodiment, the present streaming system 201 receives a time signal indicator 202 that is generated from an IP packet between a user's device 210 and the present streaming system 201. In one embodiment, the present streaming system 201 determines the time signal indicator 202 based on a timestamp of an IP packet from the user's device 210. The time signal indicator 202 indicates an access time that a user is accessing his/her device 210. In one embodiment, the present streaming system 201 selects a content item from a live channel to provide to the user's device 210 based on the time signal indicator 202 that indicates an access time that corresponds to a show time of the content item.

In another embodiment, the present streaming system 201 determines a purchase price for accessing a content item based on the access time from the time signal indicator 202. For example, the present streaming system 201 determines a purchase price for a news content item when an access time is in the morning. The present streaming system 201 may further determine that the news content item is provided free of charge when the access time is at night. Similarly, the present streaming system 201 determines a purchase price for a drama content item or a movie content item when the access time is at night.

According to one embodiment, the present streaming system 201 receives a location signal indicator 203 that is generated from an IP packet between a user's device 210 and the present streaming system 201. In one embodiment, the present streaming system 201 determines the location signal indicator 203 based on an IP address of the user's device 210. The location signal indicator 203 indicates an access location of the user's device 210. In one embodiment, the present streaming system 201 selects a content item from a live channel to provide to the user's device 210 based on the location signal indicator 203 that corresponds to a location that the content item is streamed from. For example, the location signal indicator 203 indicates that the user's device 210 is in San Francisco, Calif. The present streaming system 201 selects a sports game that is played in San Francisco instead of a sports game that is played in New York to provide to the user's device 210.

In another embodiment, the present streaming system 201 determines a purchase price for a content item based on the access location from the location signal indicator 203. For example, the present streaming system 201 determines a purchase price for accessing a content item that features a live streaming of a sports game that is located within the same region as the access location. In another example, the present streaming system 201 determines a purchase price for a weather content item regarding San Jose, Calif. if the access location is San Jose, Calif.

According to one embodiment, the present streaming system 201 receives a trend signal indicator 204 that is generated from an IP packet between a user's device 210 and the present streaming system 201. In one embodiment, the present streaming system 201 determines the trend signal indicator 204 based on a hashtag that a user inputs into his/her social network account from the user's device 210. The trend signal indicator 204 indicates a trend at an access time that a user is accessing his/her device 210. The trend identifies a popular topic that has been discussed among a plurality of users on one or a combination of social networks (e.g., TWITTER® and FACEBOOK®) during an access time. The trend signal indicator 204 may be based on a hashtag that indicates a relation to a discussion topic. In one embodiment, the present streaming system 201 compares one or more hashtags to a pre-determined tag of a content item from a live channel. If the hashtag matches the pre-determined tag of the content item, the present streaming system 201 selects the content item to provide to the user's device 210.

In another embodiment, if the hashtag matches the pre-determined tag of the content item, the present streaming system 201 determines a purchase price for the content item. For example, the present streaming system 201 provides a pre-determined tag #football to a content item that features a football match. If the present streaming system 201 detects a similar hashtag #football on a social network message (e.g., a TWITTER® message) from a user, the present streaming system 201 determines a purchase price for the content item.

According to one embodiment, the present streaming system 201 receives a latest signal indicator 205 that is generated from an IP packet between a user's device 210 and the present streaming system 201. In one embodiment, the present streaming system 201 determines the latest signal indicator 205 based on a timestamp of an IP packet from the user's device 210. The timestamp indicates a time of accessing the user's device 210. The present streaming system 201 associates the latest signal indicator 205 with a real-time content item that is available (e.g., a start time of the content item derived from a program guide for a channel) at the time of accessing a user's device 210. In one embodiment, the present streaming system 201 selects a content item from a live channel to provide to the user's device 210 based on the latest signal indicator 205 that corresponds to a real-time showing of the content item. In another embodiment, the present streaming system 201 determines a purchase price for accessing the real-time content item based on the latest signal indicator 205.

According to one embodiment, the present streaming system 201 receives an editorial signal indicator 206 that is generated from an IP packet between a user's device 210 and the present streaming system 201. The editorial signal indicator 206 indicates a content item that is featured on an editorial. The editorial may be provided by a content delivery network. The editorial signal indicator 206 may further include an access location of the user's device 210. The present streaming system 201 may determine the access location of the user's device 210 based on an IP address of the user's device 210. In one embodiment, the present streaming system 201 selects a content item a live channel to provide to the user's device 210 based on the editorial signal indicator 206 indicating that the content item is featured on an editorial. In another embodiment, the present streaming system 201 determines a purchase price for accessing a content item that is featured on an editorial based on the editorial signal indicator 206.

According to one embodiment, the present streaming system 201 receives a recommendation signal indicator 207 that is generated from an IP packet between a user's device 210 and the present streaming system 201. The recommendation signal indicator 207 may further include an access location of the user's device 210. The present streaming system 201 may determine the access location of the user's device 210 based on an IP address of the user's device 210. In one embodiment, the content metadata from the recommended signal indicator 207 indicates a rating of a content item. For example, a user selects four out of five stars for a content item on a user interface of the user's device. The recommended signal indicator 207 may be based on an aggregate of ratings of a content item from a plurality of users. In one embodiment, the present streaming system 201 selects a content item from a live channel to provide to the user's device 210 if the recommendation signal indicator 207 satisfies a pre-determined threshold. In another embodiment, the present streaming system 201 selects a first content item from a first live channel over a second content item from a second live channel to provide to the user's device 210 if the recommendation signal indicator 207 for the first content item provides a higher rating than that of the second content item. In another embodiment, the present streaming system 201 receives the recommendation signal indicator 207 for the content item, and determines a purchase price for the content item if the plurality of recommendation signal indicators 207 satisfies a predetermined threshold.

In another embodiment, the recommended signal indicator 207 indicates a viewing habit of a user. For example, the viewing habit is related to a type of content item, such as a news type, a sports type, a drama type, and a movie type. The present streaming system 201 determines a viewing habit of the user based on a frequency of accessing a type of content item that satisfies a predetermined threshold, In one embodiment, the present streaming system 201 selects a content item from a live channel to provide to the user's device 210 based on the content item that corresponds to the viewing habit of the user. In another embodiment, the present streaming system 201 determines a purchase price for accessing a content item that corresponds to the viewing habit of the user.

According to one embodiment, the present streaming system 201 receives a favorite signal indicator 208 that is generated from an IP packet between a user's device 210 and the present streaming system 201. The favorite signal indicator 208 indicates a content item that a user has configured and marked as a favorite. The favorite signal indicator 208 may further include an access location of the user's device 210. The present streaming system 201 may determine the access location of the user's device 210 based on an IP address of the user's device 210. In one embodiment, the present streaming system 201 selects a content item from a live channel to provide to the user's device 210 based on content metadata of the content item that indicates that the user has marked the content item as a favorite. In another embodiment, the present streaming system 201 determines a purchase price for accessing a content item that the user has marked as a favorite.

According to one embodiment, the present streaming system 201 receives a popularity signal indicator 209 that is generated from an IP packet between a user's device 210 and the present streaming system 201. In one embodiment, the popularity signal indicator 209 is based on trending data for a hashtag that is associated with a content item. In another embodiment, the popularity signal indicator 209 is based on a number of users at an access location that access a content item. The present streaming system 201 derives the access location using an IP address of the user's device 210. The popularity signal indicator 209 indicates a content item that is accessed by a number of users satisfying or exceeding a threshold number over a particular time period. In one embodiment, the present streaming system 201 selects a content item from a live channel to provide to the user's device based on the popularity signal indicator 209 indicating that the content item is accessed by a number of users that exceed a threshold number. In another embodiment, the present streaming system 201 selects a first content item from a first live channel over a second content item from a second live channel to provide to the user's device 210 based on the popularity signal indicator 209 indicating that the first content item is accessed by a higher number of users than the second content item. The present streaming system 201 determines a purchase price for a content item based on the popularity signal indicator 209.

Figure 3:
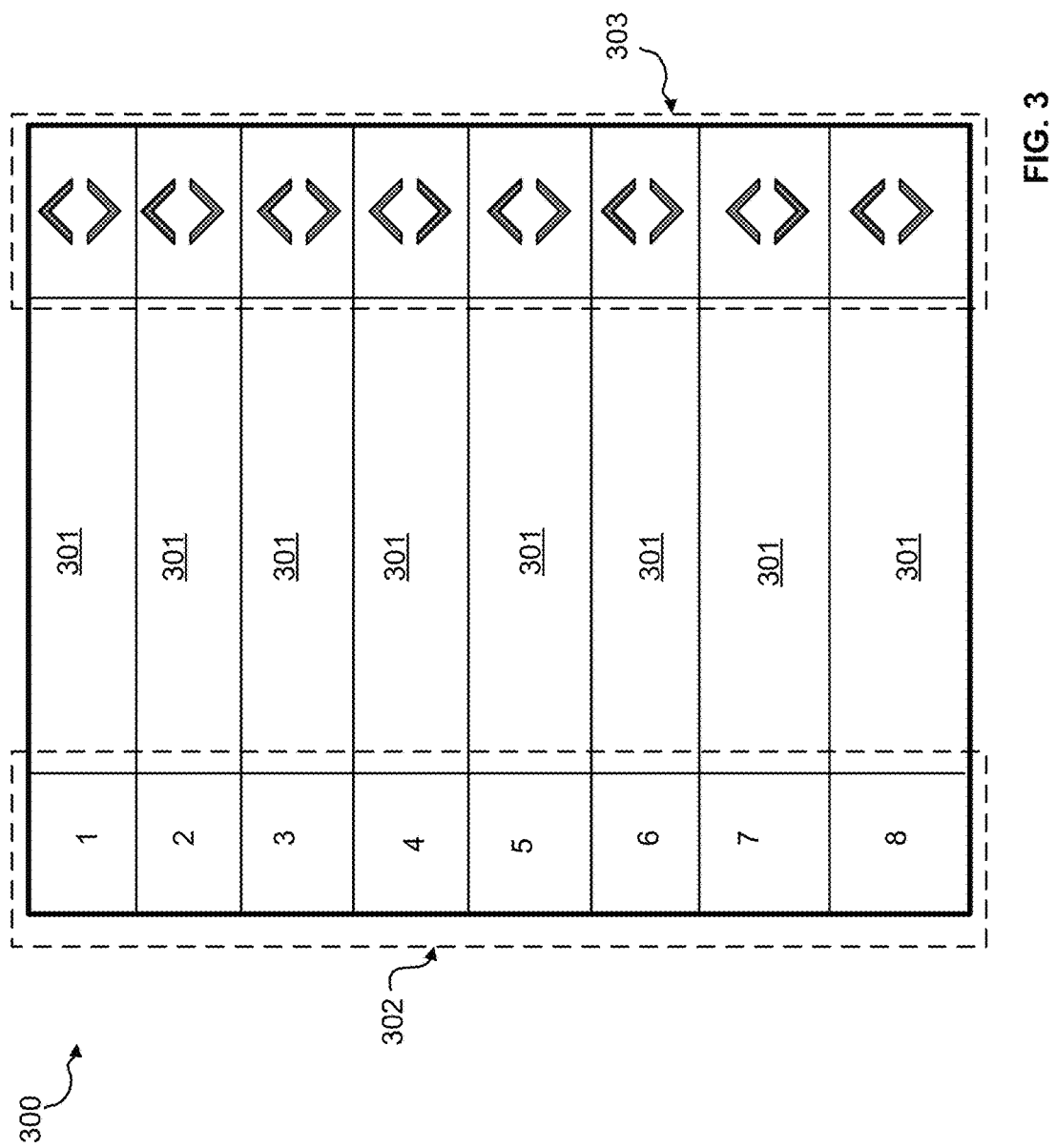
FIG. 3 illustrates an exemplary user interface of the present streaming system, according to one embodiment.

FIG. 3 illustrates an exemplary user interface of the present streaming system, according to one embodiment. The user interface 300 allows a user to configure and rank content items based on various signal indicators. The user interface 300 includes a plurality of ranks 302 for signal indicators 301. The user interface 500 further includes configuration buttons 303 to allow a user to adjust the ranking of a corresponding signal indicator 301. For example, the user can adjust the ranking of a trend signal indicator from a fourth-place ranking to a first-place ranking.

Figure 4:
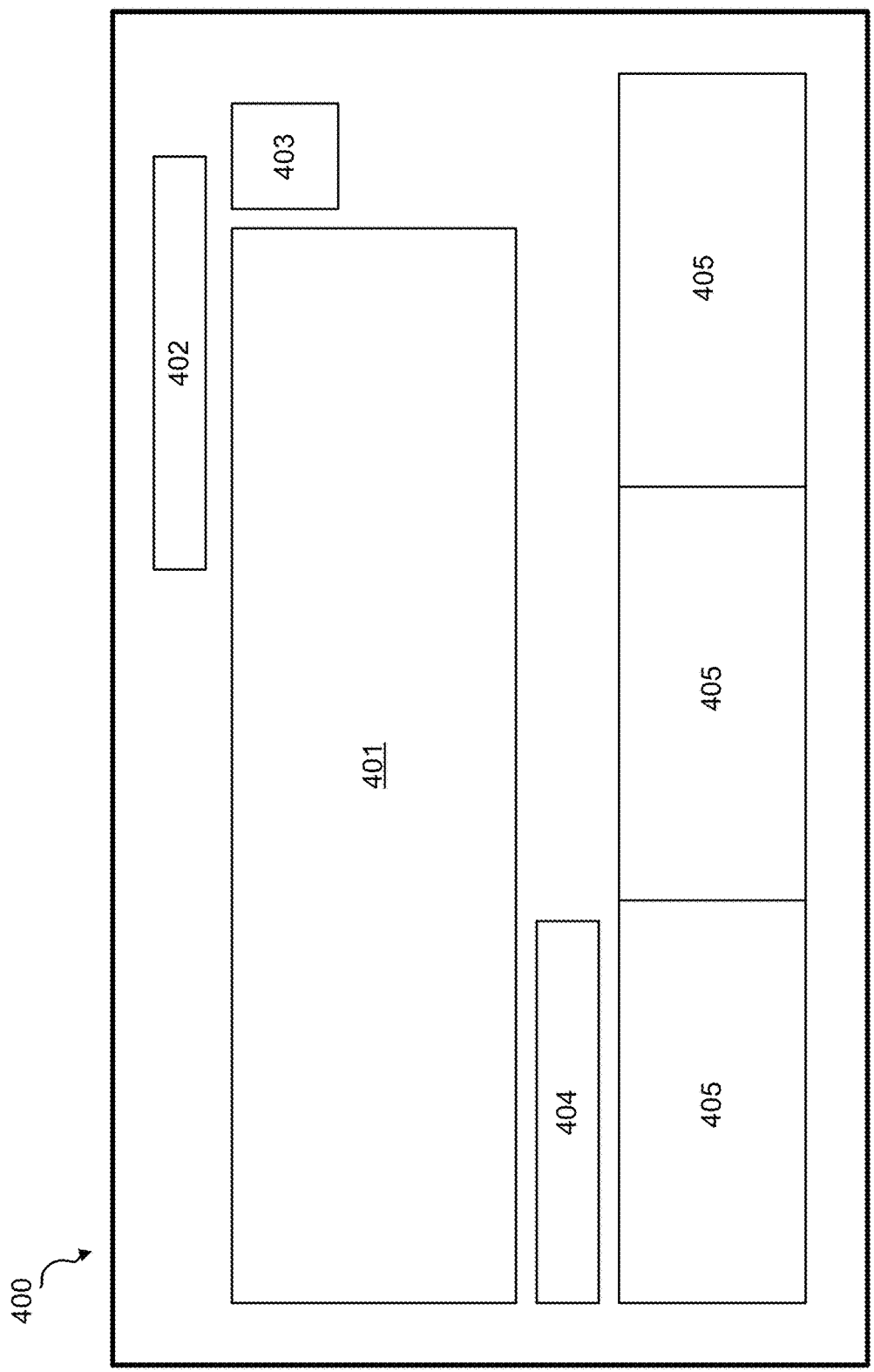
FIG. 4 illustrates another exemplary user interface of the present streaming system, according to one embodiment.

FIG. 4 illustrates another exemplary user interface of the present streaming system, according to one embodiment. The user interface 400 includes a content item 401 that is available (e.g., via live streaming) to a user at his/her access time of a device and one or more subsequent content items 405 that are available to the user after the content item 401 has finished live streaming. The content items 401 and 405 include, but are not limited to, a title, a rating, a duration, a description, and an image. The user interface 400 includes a purchase price 404 for accessing the content item 401. The user interface 400 includes a selection button 402 for purchasing and accessing the content item 401. The user interface 400 further includes a signal indicator 403 that has been ranked by the user. Each content item 405 further includes a purchase price for accessing the content item 405 or provides an indication that the content item 405 is free for access.

According to one embodiment, the present streaming system determines a purchase price for accessing a channel that may be provided by a content delivery network, for example, a television station, a radio station, and a broadcast station. The channel includes a plurality of content items that are delivered over a particular period of time. In one embodiment, the present streaming system determines a purchase price for accessing the channel over a desired time period (e.g., $9.99 per 24 hours).

Figure 5:
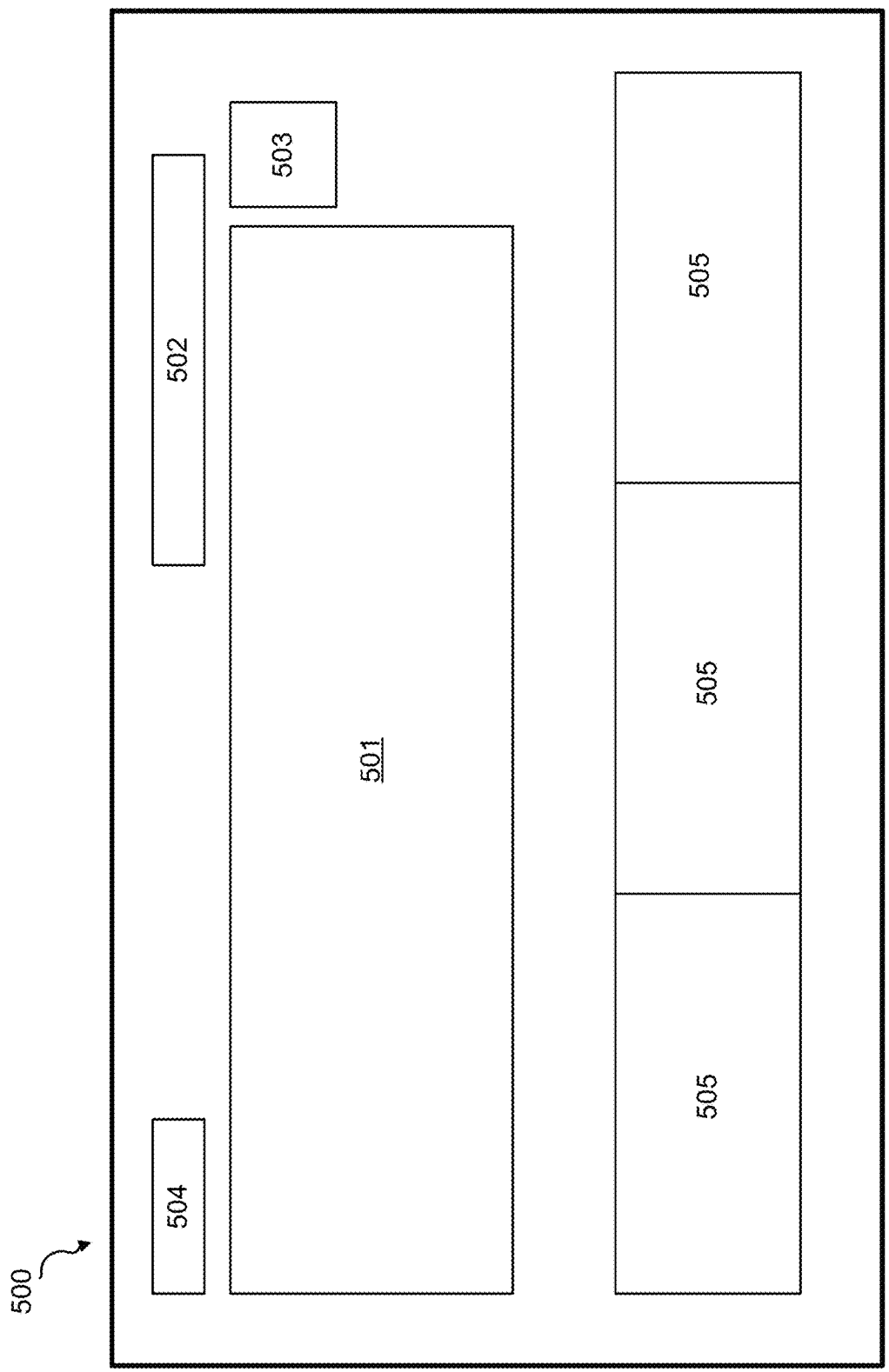
FIG. 5 illustrates another exemplary user interface of the present streaming system, according to one embodiment.

FIG. 5 illustrates another exemplary user interface of the present streaming system, according to one embodiment. The user interface 500 includes a channel 504 that features a content item 501 that is available to a user at his/her access time of a device and one or more subsequent content items 505 that are available to user after the content item 501 has finished live streaming. The content items 501 and 505 include, but are not limited to, a title, a rating, a duration, a description, and an image. The user interface 500 includes a selection button 502 for accessing the channel 504 at a purchase price over a desired time period. The user interface 500 includes a signal indicator 503 that has been ranked by the user.

According to one embodiment, the present streaming system provides a user interface for purchasing a content item or a channel over a desired time period. The user interface includes pricing information for the content item or the channel over the desired time period. For example, the pricing information for a purchase is $9.99 for 24 hours. The user interface further allows the user to specify payment information including a type of credit card, (e.g., VISA®, MASTERCARD®, and AMERICAN EXPRESS®), a credit card number, an expiration month, an expiration year, and a card verification code (CVC). The present streaming system receives and processes the payment information. According to one embodiment, the present streaming system communicates with an external payment processing system (e.g., STRIPE®) to process the payment information. According to one embodiment, the present streaming system receives authentication information (e.g., a username and a password) from a user with an existing account or subscription with the channel and grants a user access to a channel or a content item.

According to one embodiment, the present streaming system includes an electronic programming guide (EPG). The EPG includes a text based feed that describes a content item that is being played at a specified time. In one embodiment, the present streaming system determines a purchase price at a channel level or a content item level that is displayed on the EPG. The present streaming system dynamically changes the purchase price for a channel or a content item based on the ranking of the signal indicators. This provides optimal monetization for time-sensitive content items, for example, news and sports. According to one embodiment, the present streaming system allows configuration of an EPG for a channel to specify one or more content items that are available to a user that has an existing account or subscription with the channel.

Figure 6:
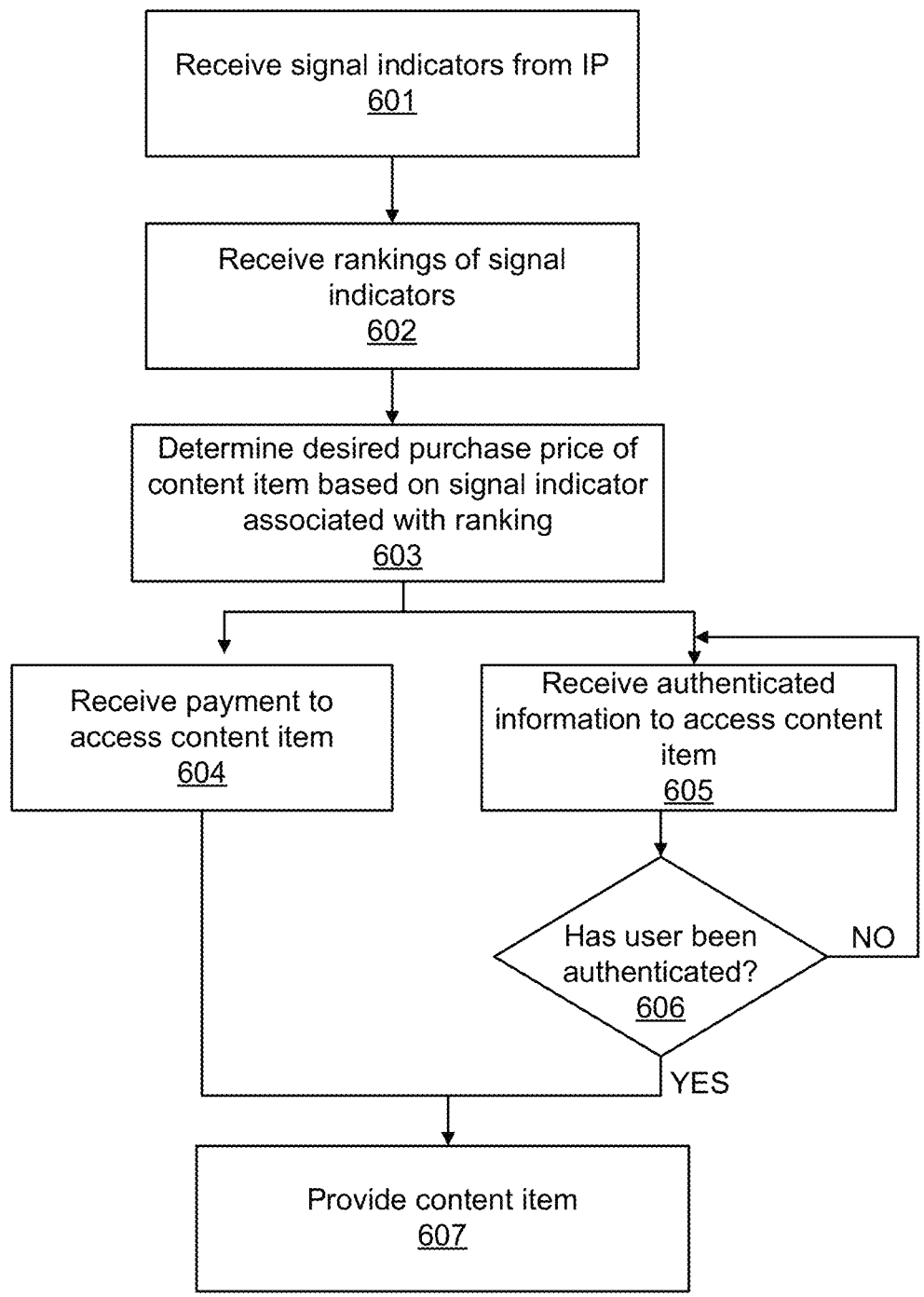
FIG. 6 illustrates a flowchart of an exemplary process for providing dynamic pricing, according to one embodiment.

FIG. 6 illustrates a flow-chart of an exemplary process for providing dynamic pricing, according to one embodiment. The present streaming system receives one or more signal indicators that are generated from an IP packet between a user's device and the present streaming system (at 601). For example, the present streaming system receives a favorite signal indicator that indicates a content item that has been marked as a favorite by the user. The present streaming system receives rankings of the signal indicators (at 602). For example, the present streaming system receives a first-place rank for the favorite signal indicator and a second-place rank for the popular signal indicator. The present streaming system determines a purchase price of a content item based on a signal indicator that is associated with a ranking (at 603). For example, the present streaming system determines a higher purchase price of a first content item that satisfies a signal indicator associated with the first-place rank and a lower purchase price of a second content item that satisfies a signal indicator associated with the second-place rank. The present streaming system either receives payment to access the content item (at 604) or receives authenticated information to allow the user to access the content item (at 605). The present streaming system determines whether the user has been authenticated (at 606). If the present streaming system receives an authentication access or payment to allow the user to access the content item, the present streaming system proceeds to provide the content item to the user (at 607).

Figure 7:
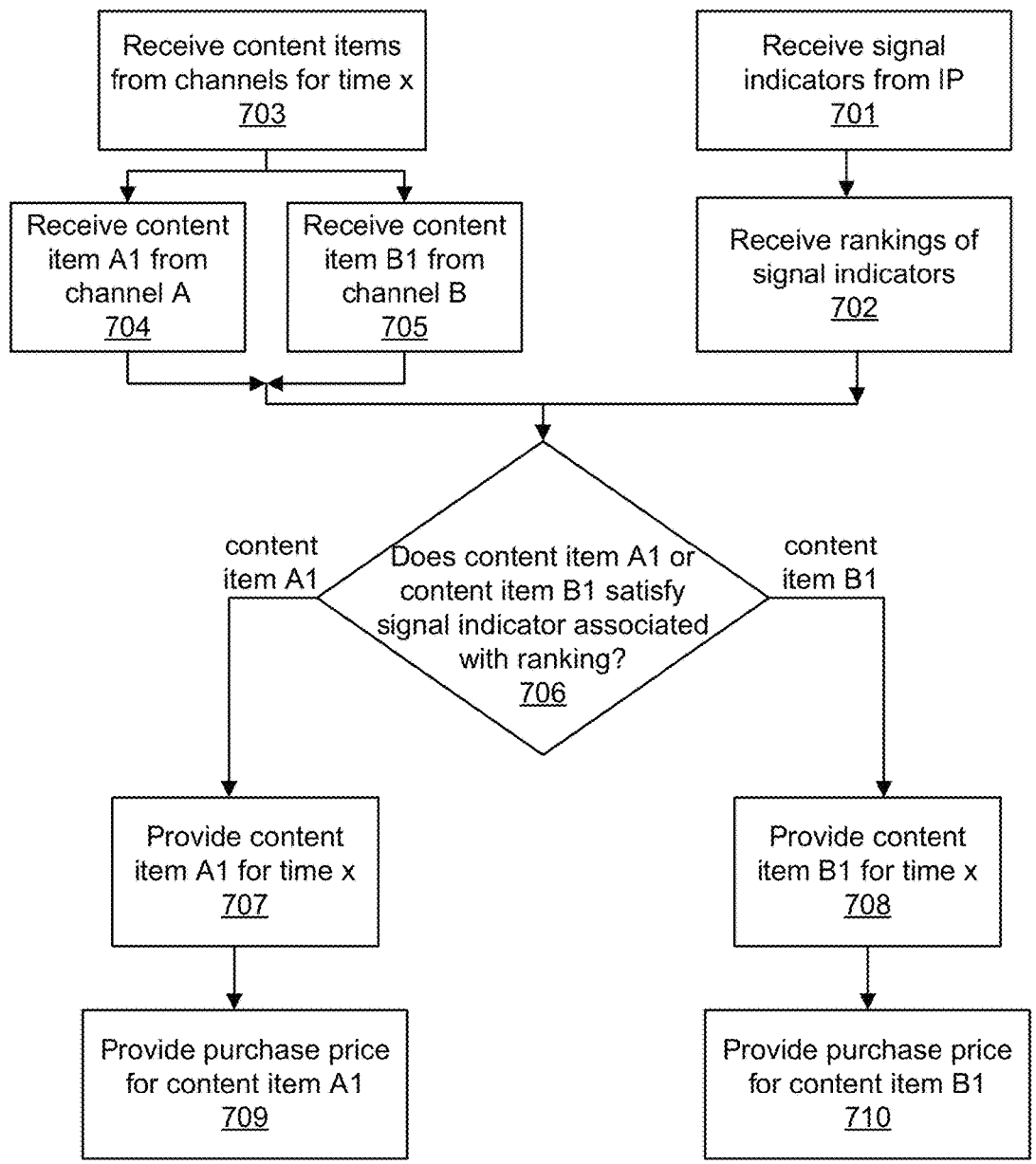
FIG. 7 illustrates a flow-chart of an exemplary process for providing a customized view of live content items, according to one embodiment.

FIG. 7 illustrates a flow-chart of an exemplary process for providing a customized view of live content items, according to one embodiment. The present streaming system receives one or more signal indicators that are generated from an IP packet between a user's device and the present streaming system (at 701). For example, the present streaming system receives a location signal indicator that indicates San Francisco, Calif., and a trend signal indicator that indicates a baseball game.

The present streaming system receives rankings of the signal indicators (at 702). For example, the present streaming system receives a first-place ranking for a location signal indicator, and a second-place ranking for a trend signal indicator.

The present streaming system receives content items from various channels that are shown at time x (at 703). The present streaming system receives content item A1 from channel A (at 704). The present streaming system receives content item B1 from channel B (at 705). It is understood that the present streaming system may receive content items from a plurality of channels without deviating from the scope of the present disclosure. For example, the present streaming system receives a first sports content item showing a baseball game in San Francisco and a second sports content item showing a baseball game in New York that will be shown simultaneously at 9 p.m.

The present streaming system determines whether content item A1 or content item B1 satisfies one or more signal indicators associated with their corresponding rankings (at 706). If content item A1 satisfies the signal indicator associated with a ranking, the present streaming system provides content item A1 for time x (at 707) and a purchase price for content item A1 (at 709). If content item B1 satisfies the signal indicator associated with a ranking, the present streaming system provides content item B1 for time x (at 708) and a purchase price for content item B1 (at 710).

For example, the present streaming system selects the first sports content item showing the baseball game in San Francisco instead of the second sports content item showing the baseball game in New York to provide to the user's device based on the location signal indicator that indicates San Francisco, Calif. associated with the first-place ranking and the trend signal indicator that indicates baseball game associated with the second-place ranking. According to one embodiment, the present streaming system selects a content item based on a plurality of signal indicators associated with their corresponding rankings. In another embodiment, the present streaming system selects a content item based on a pre-defined weighting factor for each signal indicator. The present streaming system further allows configuration of the pre-defined weighting factor for each signal indicator.

Figure 8:
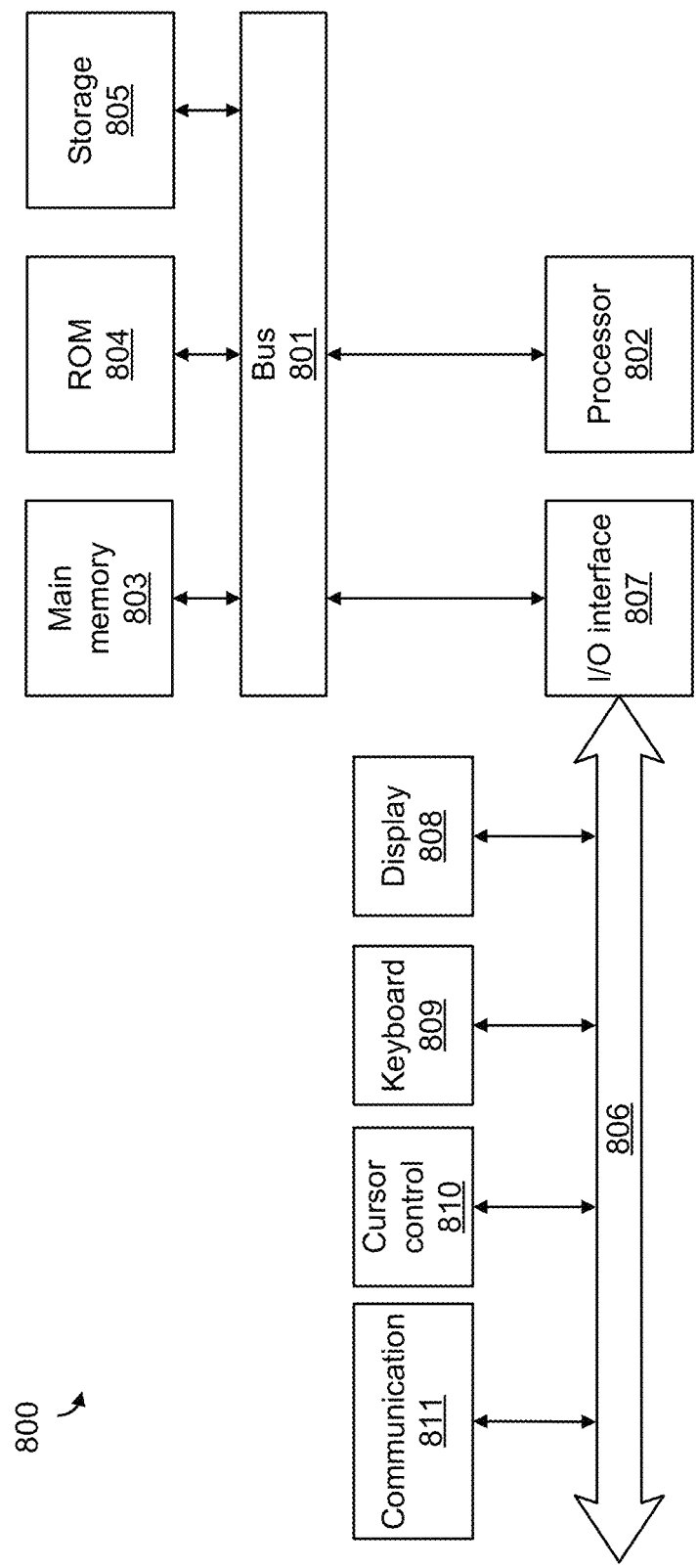
FIG. 8 illustrates an exemplary computer architecture that may be used for the present system, according to one embodiment.

FIG. 8 illustrates an exemplary computer architecture that may be used for the present system, according to one embodiment. The exemplary computer architecture may be used for implementing one or more components described in the present disclosure including, but not limited to, the present system. One embodiment of architecture 800 includes a system bus 801 for communicating information, and a processor 802 coupled to bus 801 for processing information. Architecture 800 further includes a random access memory (RAM) or other dynamic storage device 803 (referred to herein as main memory), coupled to bus 801 for storing information and instructions to be executed by processor 802. Main memory 803 also may be used for storing temporary variables or other intermediate information during execution of instructions by processor 802. Architecture 800 may also include a read only memory (ROM) and/or other static storage device 804 coupled to bus 801 for storing static information and instructions used by processor 802.

A data storage device 805 such as a magnetic disk or optical disc and its corresponding drive may also be coupled to architecture 800 for storing information and instructions. Architecture 800 can also be coupled to a second I/O bus 806 via an I/O interface 807. A plurality of I/O devices may be coupled to I/O bus 806, including a display device 808, an input device (e.g., an alphanumeric input device 809 and/or a cursor control device 810).

The communication device 811 allows for access to other computers (e.g., servers or clients) via a network. The communication device 811 may include one or more modems, network interface cards, wireless network interfaces or other interface devices, such as those used for coupling to Ethernet, token ring, or other types of networks.

The above example embodiments have been described hereinabove to illustrate various embodiments of implementing a system and method for providing a customized view for live content. Various modifications and departures from the disclosed example embodiments will occur to those having ordinary skill in the art. The subject matter that is intended to be within the scope of the disclosure is set forth in the following claims.

We claim:

1. A computer-implemented method, comprising:
   receiving an Internet protocol (IP) packet transmitted between a device and a content delivery network, wherein the content delivery network streams a channel that is configured to provide a content item using the Internet protocol;
   determining a geographical access location signal indicator based on an IP address included in the IP packet and an access time signal indicator based on a timestamp included in the IP packet;
   selecting, from a plurality of content items, one or more content items based on the IP packet to provide in a customized view of selectable content items at the device, wherein each of the one or more content items is selected based on a location attribute of the content item corresponding to the geographical access location signal indicator based on the IP address included in the IP packet and a time attribute of the content item corresponding to the access time signal indicator based on the timestamp included in the IP packet;
   determining a respective purchase price for each of the one or more content items based on the geographical access location signal indicator and the access time signal indicator; and
   providing the respective purchase price for each of the one or more content items for display in the customized view of the selectable content items at the device.

2. The computer-implemented method of claim 1, wherein the location attribute is indicative of a broadcast location associated with the content item.

3. The computer-implemented method of claim 1, wherein the time attribute is indicative of a show time associated with the content item.

4. The computer-implemented method of claim 1, further comprising receiving a ranking of the indicator.

5. The computer-implemented method of claim 4, further comprising selecting a first content item over a second content item to provide to the device based on the ranking of the indicator.

6. The computer-implemented method of claim 1, further comprising receiving payment information to access the content item.

7. The computer-implemented method of claim 1, further comprising receiving authentication information to grant an access to the content item.

8. The computer-implemented method of claim 1, further comprising providing a desired fee for accessing the channel over a desired time period based on at least one of the geographical access location signal indicator the access time signal indicator.

9. A non-transitory computer readable medium having stored thereon computer-readable instructions that, when executed on a processor, operate to:
   receive an Internet protocol (IP) packet transmitted between a device and a content delivery network, wherein the content delivery network delivers a channel that is configured to provide a content item using the Internet protocol;
   determine a geographical access location signal indicator based on an IP address included in the IP packet and an access time signal indicator based on a timestamp included in the IP packet;
   select, from a plurality of content items, one or more content items based on the IP packet to provide in a customized view of selectable content items at the device, wherein each of the one or more content items is selected based on a location attribute of the content item corresponding to the geographical access location signal indicator based on the IP address included in the IP packet and a time attribute of the content item corresponding to the access time signal indicator based on the timestamp included in the IP packet
   determine a respective purchase price for each of the one of more content items based on the geographical access location signal indicator and the access time signal indicator; and
   provide the respective purchase price for each of the one or more content items for display in the customized view of the selectable content items at the device.

10. The non-transitory computer readable medium of claim 9, wherein the location attribute is indicative of a broadcast location associated with the content item.

11. The non-transitory computer readable medium of claim 9, wherein the time attribute is indicative of a show time associated with the content item.

12. The non-transitory computer readable medium of claim 9, wherein the processor executes the instructions to receive a ranking of the indicator.

13. The non-transitory computer readable medium of claim 12, wherein the processor executes the instructions to select a first content item over a second content item to provide to the device based on the ranking of the indicator.

14. The non-transitory computer readable medium of claim 9, wherein the processor executes the instructions to receive payment information to access the content item.

15. The non-transitory computer readable medium of claim 9, wherein the processor executes the instructions to receive authentication information to grant an access to the content item.

16. A system comprising:
   a processor; and
   a network interface;

the processor being configured to:
- receive, via the network interface, an Internet protocol (IP) packet transmitted between a device and a content delivery network, wherein the content delivery network streams a channel that is configured to provide a content item using the Internet protocol;
- determine a geographical access location signal indicator based on an IP address included in the IP packet and an access time signal indicator based on a timestamp included in the IP packet;
- select, from a plurality of content items, one or more content items based on the IP packet to provide in a customized view of selectable content items at the device, wherein each of the one or more content items is selected based on a location attribute of the content item corresponding to the geographical access location signal indicator based on the IP address included in the IP packet and a time attribute of the content item corresponding to the access time signal indicator based on the timestamp included in the IP packet;
- determine a respective purchase price for each of the one of more content items based on the geographical access location signal indicator and the access time signal indicator; and
- provide the respective purchase price for each of the one or more content items for display in the customized view of the selectable content items at the device.

\* \* \* \* \*